(12) United States Patent
Graham et al.

(10) Patent No.: US 10,988,268 B2
(45) Date of Patent: Apr. 27, 2021

(54) SYSTEM AND METHOD FOR PERFORMING OPERATIONS ON AN ENGINE

(71) Applicant: General Electric Company, Schenectady, NY (US)

(72) Inventors: Andrew Crispin Graham, Badminton (GB); Herbert Chidsey Roberts, Middletown, OH (US); Lyle Timothy Rasch, Fairfield, OH (US); Michael Dean Fullington, West Chester, OH (US); Wayne Ray Grady, Hamilton, OH (US); David Scott Diwinsky, West Chester, OH (US); Michael Todd Stowe, Liberty Township, OH (US)

(73) Assignee: General Electric Company, Schenectady, NY (US)

(*) Notice: Subject to any disclaimer, the term of this patent is extended or adjusted under 35 U.S.C. 154(b) by 121 days.

(21) Appl. No.: 16/008,510

(22) Filed: Jun. 14, 2018

(65) Prior Publication Data
US 2019/0382138 A1    Dec. 19, 2019

(51) Int. Cl.
*B64F 5/40* (2017.01)
*B25J 9/06* (2006.01)
(Continued)

(52) U.S. Cl.
CPC .................. *B64F 5/40* (2017.01); *B25J 9/06* (2013.01); *B25J 9/1682* (2013.01); *B25J 11/005* (2013.01);
(Continued)

(58) Field of Classification Search
CPC ......... B25J 9/06; B25J 9/1682; B25J 11/005; B25J 13/087; B25J 13/088; B25J 15/0019; B25J 15/0066
(Continued)

(56) References Cited

U.S. PATENT DOCUMENTS

| 4,260,941 A | 4/1981 | Engelberger et al. |
| 4,267,424 A * | 5/1981 | Shimatake ................. B25J 9/00 219/125.1 |

(Continued)

FOREIGN PATENT DOCUMENTS

EP    1747856 A2 *  1/2007  ................ B25J 9/00

OTHER PUBLICATIONS

Sandia National Laboratories, Multi-Robot Cooperative Behavior, 2018, 5 pages. http://www.sandia.gov/research/robotics/advanced_controls/multi_robot_cooperative_behavior.html.

(Continued)

*Primary Examiner* — Ronald D Hartman, Jr.
(74) *Attorney, Agent, or Firm* — Dority & Manning, P.A.

(57) ABSTRACT

A system is provided for performing an operation on a component of an engine. The component includes a first side positioned within an interior of the engine. The system includes a first robotic arm defining a first distal end and including a first utility member positioned at the first distal end, the first robotic arm moveable to the interior of the engine to a location operably adjacent to the first side of the component; and a second robotic arm defining a second distal end and including a second utility member positioned at the second distal end, the second robotic arm also moveable to the interior of the engine to facilitate the first and second utility members performing the operation on the component of the engine.

28 Claims, 7 Drawing Sheets

(51) Int. Cl.
  *B25J 9/16*     (2006.01)
  *B25J 11/00*    (2006.01)
  *B25J 13/08*    (2006.01)
  *B25J 15/00*    (2006.01)
  *F01D 25/00*    (2006.01)

(52) U.S. Cl.
  CPC .......... *B25J 13/087* (2013.01); *B25J 13/088* (2013.01); *B25J 15/0019* (2013.01); *B25J 15/0066* (2013.01); *F01D 25/00* (2013.01); *F05D 2220/323* (2013.01)

(58) Field of Classification Search
  USPC ........................................................ 700/145
  See application file for complete search history.

(56) References Cited

U.S. PATENT DOCUMENTS

| | | | |
|---|---|---|---|
| 4,969,107 A * | 11/1990 | Mizutani | B25J 9/1684 219/124.34 |
| 5,490,646 A | 2/1996 | Shaw et al. | |
| 5,608,847 A | 3/1997 | Pryor | |
| 6,108,896 A | 8/2000 | Gignac et al. | |
| 7,044,706 B2 * | 5/2006 | Jung | B25J 15/0052 294/119.1 |
| 7,171,279 B2 * | 1/2007 | Buckingham | A61B 1/0055 318/568.12 |
| 7,256,880 B2 | 8/2007 | Binder et al. | |
| 7,649,620 B2 * | 1/2010 | Hessert | B25J 9/1682 356/138 |
| 7,717,477 B1 * | 5/2010 | Thulin | B25J 15/0616 285/121.5 |
| 8,127,423 B2 | 3/2012 | Toeniskoetter et al. | |
| 8,132,306 B2 | 3/2012 | Kipping et al. | |
| 8,286,320 B2 | 10/2012 | Pienta et al. | |
| 8,374,722 B2 * | 2/2013 | Buckingham | B08B 9/045 104/138.2 |
| 8,561,290 B2 * | 10/2013 | Yamashita | B23Q 7/04 198/346.2 |
| 8,927,897 B2 | 1/2015 | Xu et al. | |
| 9,073,156 B2 | 7/2015 | Clark et al. | |
| 9,789,549 B2 * | 10/2017 | Nguyen | B25J 5/007 |
| 9,821,456 B2 * | 11/2017 | Riedel | B25J 9/0087 |
| 9,981,382 B1 * | 5/2018 | Strauss | B25J 9/1666 |
| 10,041,371 B1 * | 8/2018 | DeAscanis | H04N 7/18 |
| 10,059,342 B2 * | 8/2018 | Ricci | G01C 21/3484 |
| 10,252,421 B2 * | 4/2019 | Fadlovich | B25J 11/005 |
| 10,737,387 B2 * | 8/2020 | Du | B25J 9/1638 |
| 2002/0087232 A1 * | 7/2002 | Lapham | B25J 9/1656 700/245 |
| 2005/0224474 A1 | 10/2005 | Kilburn | |
| 2005/0235493 A1 | 10/2005 | Philip et al. | |
| 2007/0038345 A1 * | 2/2007 | Heider | B60R 16/037 701/49 |
| 2007/0228017 A1 * | 10/2007 | Wei | B23H 1/00 219/69.14 |
| 2008/0077276 A1 * | 3/2008 | Montero Sanjuan | B21J 15/14 700/245 |
| 2009/0249606 A1 * | 10/2009 | Diez | B23K 37/0461 29/428 |
| 2012/0275873 A1 | 11/2012 | Hynous et al. | |
| 2015/0066246 A1 * | 3/2015 | Martin | H04W 4/50 701/2 |
| 2015/0107113 A1 | 4/2015 | Magnano et al. | |
| 2016/0129592 A1 * | 5/2016 | Saboo | G06Q 50/28 700/248 |
| 2016/0300496 A1 * | 10/2016 | Cheatham, III | G08G 5/0069 |
| 2017/0106924 A1 * | 4/2017 | Hafenrichter | B25J 11/005 |
| 2017/0336774 A1 * | 11/2017 | Freeman | G05B 11/01 |
| 2018/0272530 A1 * | 9/2018 | Watanabe | B25J 9/0084 |
| 2018/0326582 A1 * | 11/2018 | Yokoyama | G05B 19/4182 |
| 2019/0054638 A1 * | 2/2019 | Norton | B25J 9/06 |
| 2019/0202301 A1 * | 7/2019 | O'Brien | A47L 11/4011 |
| 2019/0315002 A1 * | 10/2019 | Haddadin | B25J 9/1669 |
| 2019/0358816 A1 * | 11/2019 | Saito | B25J 3/04 |
| 2019/0381965 A1 * | 12/2019 | McCool | B60R 21/264 |
| 2020/0231109 A1 * | 7/2020 | Baltaxe | G06K 9/6267 |

OTHER PUBLICATIONS

International Search Report Corresponding to Application No. PCT/US2019/037026 dated Oct. 15, 2019.

* cited by examiner

SYSTEM AND METHOD FOR PERFORMING OPERATIONS ON AN ENGINE

FIELD

The present subject matter relates generally to a system for performing an operation on a component of an engine, and a method for performing the same.

BACKGROUND

At least one known gas turbine engine includes, in serial flow arrangement, a compressor for compressing air flowing through the engine, a combustor for mixing fuel with the compressed air such that the mixture may be ignited, a turbine for providing power to the compressor. The compressor, combustor and turbine are sometimes collectively referred to as the core engine.

Through continuous operation one or more the components of the gas turbine engine may become worn or damaged. For example, cracks may form in or beneath a surface of one or more of the components due to, e.g., repeated stress during operation, exposure to temperatures in excess of a designed temperature limit, etc. In order to repair such components, the gas turbine engine is typically removed from the aircraft (e.g., uninstalled from beneath a wing of an aircraft) and disassembled to expose the component. The component may be repaired, and the engine reassembled and reinstalled, such that the engine may be used further.

However, such steps of removing the engine from the aircraft and disassembling the engine to expose the component to be repaired may be a relatively time-consuming and expensive process. Accordingly, a system and method for repairing a component of an engine without necessarily requiring the engine be removed from the aircraft and disassembled to expose such component would be beneficial.

BRIEF DESCRIPTION

Aspects and advantages of the invention will be set forth in part in the following description, or may be obvious from the description, or may be learned through practice of the invention.

In one an exemplary aspect of the present disclosure, a system is provided for performing an operation on a component of an engine. The component includes a first side positioned within an interior of the engine. The system includes a first robotic arm defining a first distal end and including a first utility member positioned at the first distal end, the first robotic arm moveable to the interior of the engine to a location operably adjacent to the first side of the component; and a second robotic arm defining a second distal end and including a second utility member positioned at the second distal end, the second robotic arm also moveable to the interior of the engine to facilitate the first and second utility members performing the operation on the component of the engine.

In certain exemplary embodiments the operation is a drilling operation.

For example, in certain exemplary embodiments the first utility member includes a mechanical drill, wherein the second utility member includes at least one of a container or a suction member, wherein the first utility member is configured to contact the first side of the component, and wherein the second utility member is configured to be positioned on a second, opposite side of the component.

For example, in certain exemplary embodiments the first utility member includes a laser drill configured for orientation towards the first side of the component, and wherein the second utility member includes a laser beam receiver.

For example, in certain exemplary embodiments the first utility member includes an electric discharge machine tool configured for orientation towards the first side of the component, and wherein the second utility member includes an electrical connector configured for electrical connection to the component.

For example, in certain exemplary embodiments the system further includes a third robotic arm defining a third distal end and including a third utility member positioned at the third distal end, the third utility member including a dielectric fluid nozzle for providing a dielectric fluid to a location between the first utility member and the component.

In certain exemplary embodiments the operation is a welding operation, wherein the first utility member includes an electrode, and wherein the second utility member includes an electrical connector configured for electrical connection to the component.

For example, in certain exemplary embodiments second utility member is configured to contact the component.

In certain exemplary embodiments the engine is a gas turbine engine, and wherein the component is at least one of an airfoil, a liner, or a shroud.

In certain exemplary embodiments the first robotic arm is operably connected to a first base, wherein the first base includes one or more motors for controlling the first robotic arm, wherein the first base is configured for positioning outside of the interior of the engine, wherein the second robotic arm is operably connected to a second base, wherein the second base includes one or more motors for controlling the second robotic arm, and wherein the second base is configured for positioning outside of the interior of the engine.

For example, in certain exemplary embodiments the system further includes a controller operably connected to the first base and the second base for controlling the first robotic arm and the second robotic arm.

In another exemplary embodiment of the present disclosure, a turbine engine assembly is provided. The turbine engine assembly includes a turbine engine defining an interior and a plurality of openings to the interior, the turbine engine including a component having a first side positioned within the interior of the turbine engine; and a system. The system includes a first robotic arm defining a first distal end and including a first utility member positioned at the first distal end, the first robotic arm positioned through at least one of the plurality of openings of the turbine engine such that the utility member is positioned operably adjacent to the first side of the component; and a second robotic arm defining a second distal end and including a second utility member positioned at the second distal end, the second robotic arm positioned through at least one of the plurality of openings of the turbine engine to facilitate the first and second utility members performing the operation on the component of the turbine engine.

In certain exemplary embodiments the operation is a drilling operation, wherein the first utility member includes a drill, and wherein the second utility member is positioned on a second, opposite side of the component during operation.

In certain exemplary embodiments the operation is a drilling operation, wherein the first utility member includes an electric discharge machine tool orientated towards the first side of the component, and wherein the second utility member includes an electrical connector electrically connected to the component, and wherein the system further includes a third robotic arm defining a third distal end and including a third utility member positioned at the third distal end, the third utility member including a dielectric fluid nozzle providing a dielectric fluid to a location between the first utility member and the component during operation.

In certain exemplary embodiments the operation is a welding operation, wherein the first utility member includes an electrode, and wherein the second utility member includes an electrical connector electrically connected to the component during operation.

In certain exemplary embodiments the component is at least one of an airfoil, a liner, or a shroud.

In an exemplary aspect of the present disclosure, a method is provided for performing an operation on a component of an engine, the component including a first side positioned within an interior of the engine. The method includes positioning a first robotic arm including a first utility member at a first distal end within the interior of the engine at a location operably adjacent to the first side of the component; positioning a second robotic arm including a second utility member at a second distal end within the interior of the engine; and performing the operation on the component of the engine utilizing the first utility member of the first robotic arm and the second utility member of the second robotic arm within the interior of the engine.

In certain exemplary aspects performing the operation on the component of the engine includes performing a drilling operation on the component of the engine.

In certain exemplary aspects performing the operation on the component of the engine includes performing a welding operation on the component of the engine.

In certain exemplary aspects positioning the first robotic arm within the interior of the engine includes extending the first robotic arm through a first opening of the engine, and wherein positioning the second robotic arm within the interior of the engine includes extending the second robotic arm through a second opening of the engine.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
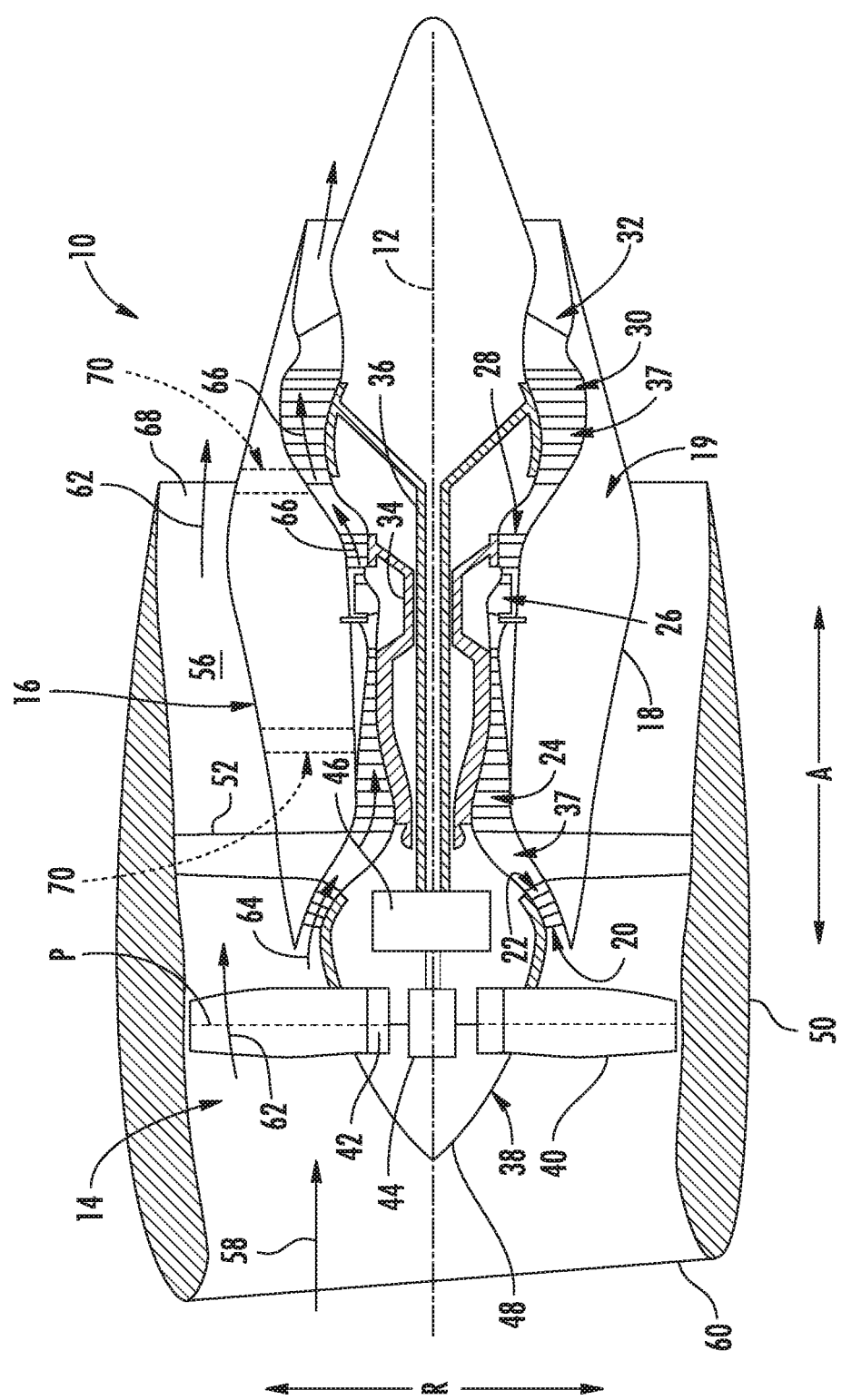
FIG. 1 is a schematic, cross-sectional view of a gas turbine engine in accordance with an exemplary embodiment of the present disclosure.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

As used herein, the terms "first", "second", and "third" may be used interchangeably to distinguish one component from another and are not intended to signify location or importance of the individual components.

The terms "forward" and "aft" refer to relative positions within a component or system, and refer to the normal operational attitude of the component or system. For example, with regard to a robotic arm, forward refers to a position closer to a distal end of the robotic arm and aft refers to a position closer to a root end of the robotic arm.

The terms "coupled," "fixed," "attached to," and the like refer to both direct coupling, fixing, or attaching, as well as indirect coupling, fixing, or attaching through one or more intermediate components or features, unless otherwise specified herein.

The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

Referring now to the drawings, wherein identical numerals indicate the same elements throughout the Figs., FIG. 1 is a schematic, cross-sectional view of a turbine engine in accordance with an exemplary embodiment of the present disclosure. More particularly, for the embodiment of FIG. 1, the turbine engine is a high-bypass turbofan jet engine 10, referred to herein as "turbofan engine 10." As shown in FIG. 1, the turbofan engine 10 defines an axial direction A (extending parallel to a longitudinal centerline 12 provided for reference) and a radial direction R. In general, the turbofan engine 10 includes a fan section 14 and a turbomachine 16 disposed downstream from the fan section 14.

The exemplary turbomachine 16 depicted generally includes an outer casing 18 that defines an annular inlet 20. Within the outer casing 18 may be considered an interior 19 of the turbomachine 16, and more specifically, of the turbofan engine 10. The outer casing 18 encases, in serial flow relationship, a compressor section including a booster or low pressure (LP) compressor 22 and a high pressure (HP) compressor 24; a combustion section 26; a turbine section including a high pressure (HP) turbine 28 and a low pressure (LP) turbine 30; and a jet exhaust nozzle section 32. The compressor section, combustion section 26, turbine section, and exhaust nozzle section 32 together define at least in part a core air flowpath 37 through the turbomachine 16. A high pressure (HP) shaft or spool 34 (or rather a high pressure spool assembly, as described below) drivingly connects the HP turbine 28 to the HP compressor 24. A low pressure (LP) shaft or spool 36 drivingly connects the LP turbine 30 to the LP compressor 22.

For the embodiment depicted, the fan section 14 includes a variable pitch fan 38 having a plurality of fan blades 40 coupled to a disk 42 in a spaced apart manner. As depicted, the fan blades 40 extend outwardly from disk 42 generally along the radial direction R. Each fan blade 40 is rotatable relative to the disk 42 about a pitch axis P by virtue of the fan blades 40 being operatively coupled to a suitable actuation member 44 configured to collectively vary the pitch of the fan blades 40 in unison. The fan blades 40, disk 42, and actuation member 44 are together rotatable about the longitudinal centerline 12 by LP shaft 36 across a power gear box 46. The power gear box 46 includes a plurality of gears for stepping down the rotational speed of the LP shaft 36 to a more efficient rotational fan speed.

Referring still to the exemplary embodiment of FIG. 1, the disk 42 is covered by rotatable front hub 48 aerodynamically contoured to promote an airflow through the plurality of fan blades 40. Additionally, the exemplary fan section 14 includes an annular fan casing or outer nacelle 50 that circumferentially surrounds the fan 38 and/or at least a portion of the turbomachine 16. The nacelle 50 is supported relative to the turbomachine 16 by a plurality of circumferentially-spaced outlet guide vanes 52. Moreover, the nacelle 50 extends over an outer portion of the turbomachine 16 so as to define a bypass airflow passage 56 therebetween.

During operation of the turbofan engine 10, a volume of air 58 enters the turbofan 10 through an associated inlet 60 of the nacelle 50 and/or fan section 14. As the volume of air 58 passes across the fan blades 40, a first portion of the air 58 as indicated by arrows 62 is directed or routed into the bypass airflow passage 56 and a second portion of the air 58 as indicated by arrow 64 is directed or routed into the LP compressor 22. The ratio between the first portion of air 62 and the second portion of air 64 is commonly known as a bypass ratio. The pressure of the second portion of air 64 is then increased as it is routed through the high pressure (HP) compressor 24 and into the combustion section 26, where it is mixed with fuel and burned to provide combustion gases 66. Subsequently, the combustion gases 66 are routed through the HP turbine 28 and the LP turbine 30, where a portion of thermal and/or kinetic energy from the combustion gases 66 is extracted.

The combustion gases 66 are then routed through the jet exhaust nozzle section 32 of the turbomachine 16 to provide propulsive thrust. Simultaneously, the pressure of the first portion of air 62 is substantially increased as the first portion of air 62 is routed through the bypass airflow passage 56 before it is exhausted from a fan nozzle exhaust section 68 of the turbofan 10, also providing propulsive thrust.

Moreover, it will be appreciated, that the exemplary turbofan engine 10 defines a plurality of openings. For example, the exemplary turbofan engine 10, and more specifically, turbomachine 16, defines a plurality of borescope openings 70 arranged along the axial direction A, the inlet 20, the exhaust nozzle 32, etc. Additionally, although not depicted, the turbofan engine 10, or more specifically, the turbomachine 16, may define one or more igniter openings, fuel air mixer openings, fuel nozzle openings, etc.

It will be appreciated, however, that the exemplary turbofan engine 10 depicted in FIG. 1 is provided by way of example only. In other exemplary embodiments the present disclosure, the turbofan engine 10 may have any other suitable configuration, such as any other suitable number of compressors or turbines, or any geared or direct drive system, variable pitch or fixed pitch fan, etc. Further, although depicted as a turbofan engine in FIG. 1, in other embodiments, any other suitable turbine engine may be provided. For example, in other embodiments, the turbine engine may be a turbojet engine, a turboprop engine, etc. Further, in still other exemplary embodiments of the present disclosure, the turbine engine may not be an aeronautical gas turbine engine, such as the engine depicted in FIG. 1, and instead may be, e.g., a land-based turbine engine used, e.g., for power generation, or a nautical turbine engine. Further, still, in other embodiments, any other suitable type of engine may be provided, such as a rotary engine, such as an internal combustion engine.

Figure 2:
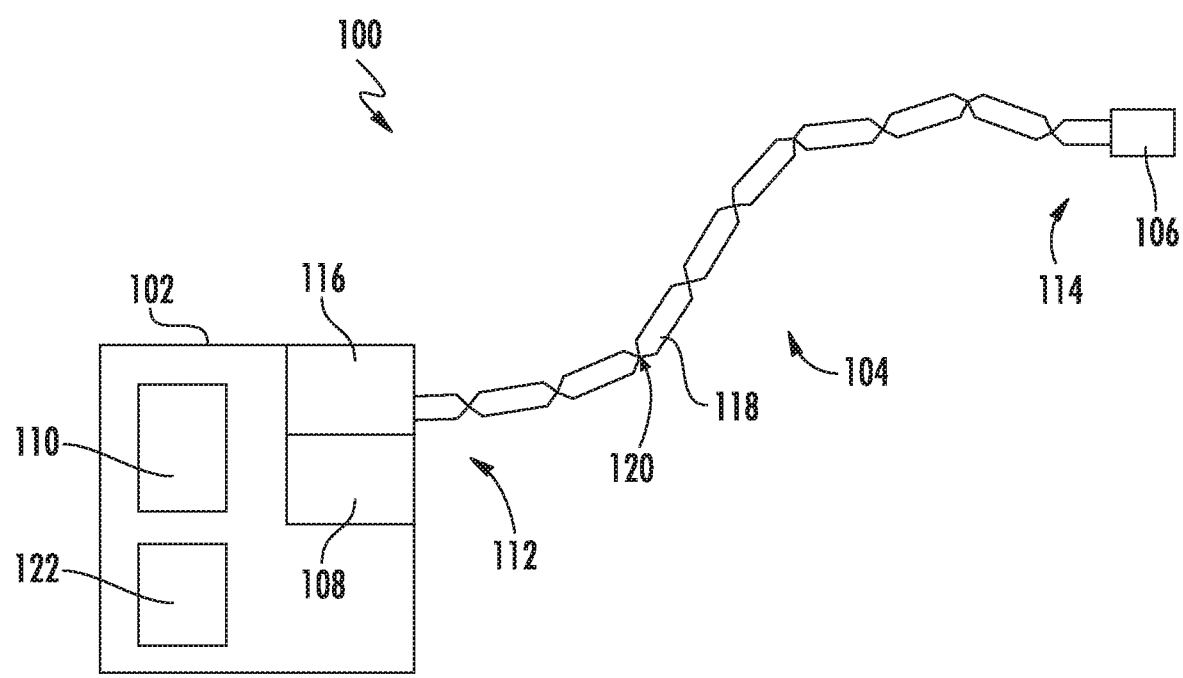
FIG. 2 is a schematic view of a robotic arm assembly in accordance with an exemplary embodiment of the present disclosure.

Referring now to FIG. 2, a schematic view of a robotic arm assembly 100 in accordance with an exemplary embodiment of the present disclosure is provided. The exemplary robotic arm assembly 100 depicted generally includes a base 102, a robotic arm 104, and a utility member 106. The base 102 generally includes an actuator pack 108 and a controller 110. The controller 110 is operably coupled to the actuator pack 108 for controlling operation of the robotic arm assembly 100. Additionally, the controller 110 may be operably coupled to the utility member 106 and/or one or more sensors (not shown) attached to or embedded in the robotic arm 104 and/or utility member 106. Further, the robotic arm 104 extends generally between a root end 112 and a distal end 114. As will be explained in greater detail below, the robotic arm 104 includes an attachment section 116 at the root end 112, with the attachment section 116, for the embodiment depicted, attached to the actuator pack 108 of the base 102. Additionally, the robotic arm 104 includes the utility member 106 at the distal end 114. The utility member 106 may include one or more components of, e.g., a welder, a drill (such as a laser drill or mechanical drill), an electric discharge machine (EDM), etc. Alternatively, the utility member 106 may be configured in any other suitable manner.

Moreover, the robotic arm 104 of the exemplary robotic arm assembly 100 depicted is generally formed of a plurality of links 118 and a plurality of joints 120, with the plurality of links 118 sequentially arranged and movably coupled to one another with the plurality of joints 120. At least certain of the plurality of links 118 are operable with the actuator pack 108, such that one or more actuators or motors (not shown) of the actuator pack 108 may control operation (such as a position and/or orientation) of the robotic arm 104. However, in other embodiments, any other suitable configuration may be provided for manipulating or otherwise controlling the plurality of links 118 of the robotic arm 104 of the exemplary robotic arm assembly 100.

Further, as is depicted, the base 102 includes one or more support structures 122 operable with the utility member 106 for assisting the utility member 106 and performing certain operations. For example, when the utility member 106 is configured as a welder, the one or more support structures 122 may include, e.g., a gas supply, a wire supply, an electric power supply, etc.

Briefly, it will be appreciated that the robotic arm 104 may define certain parameters to further enable it to reach the relatively remote positions within the interior of the turbomachine 16. More specifically, for the embodiment shown, the robotic arm 116 defines a length between the root end 112 in the distal end 114 of least about thirty-six (36) inches, such as at least about forty-eight (48) inches, such as at least about sixty (60) inches, such as up to about 600 inches. Similarly, the robotic arm 116 defines a maximum diameter between the root end 120 and the distal end 122, which for the embodiment depicted is a maximum diameter of each of the individual segments 118 of the robotic arm 104, less than about five (5) inches. For example, the maximum diameter of the robotic arm 104 may be less than about three (3) inches, such as less than about 2.5 inches, such as less than about one (1) inch. Such may further allow the robotic arm 104 to reach the relatively remote locations within the interior of the turbomachine 16.

Figure 3:
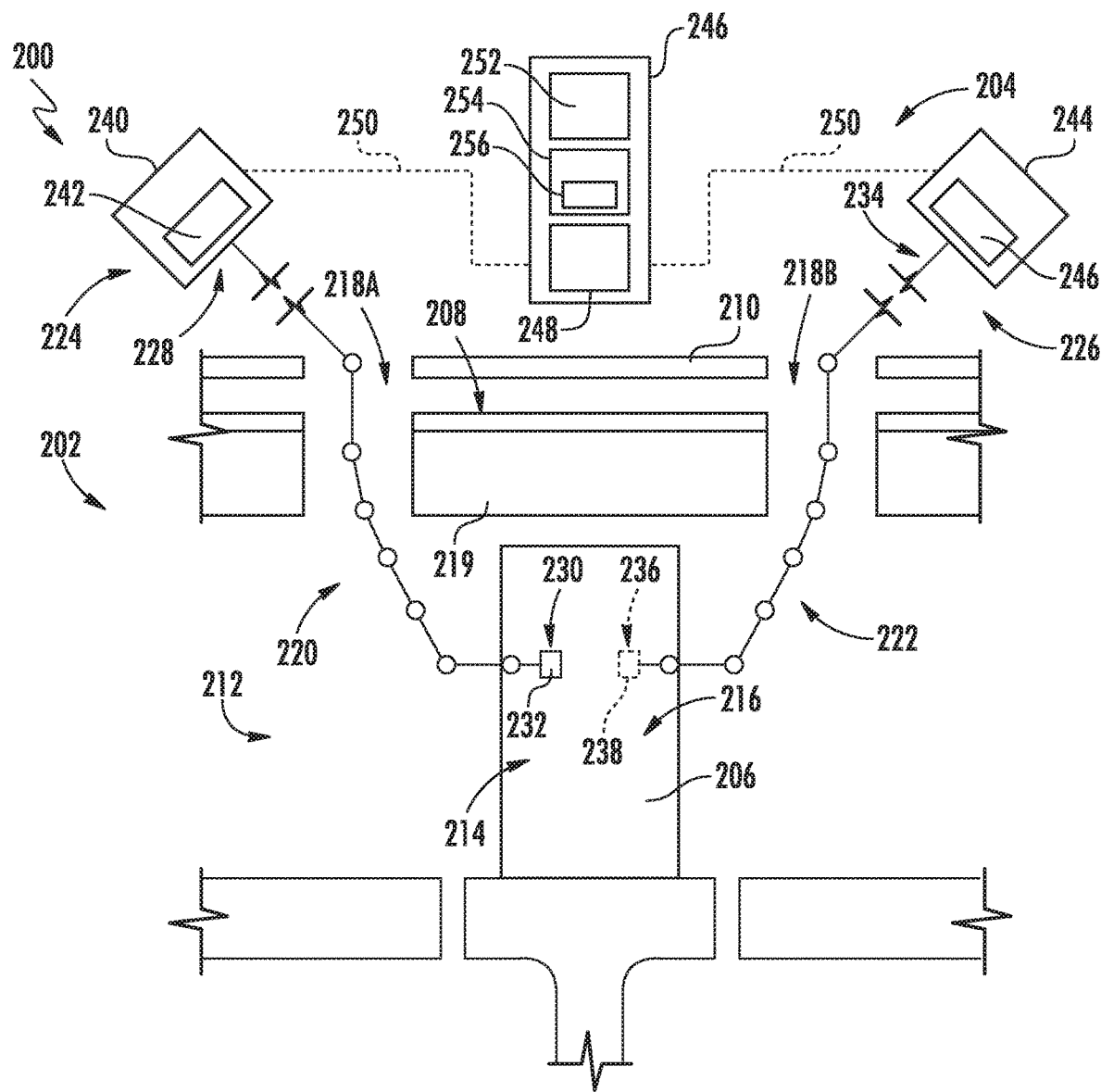
FIG. 3 is a schematic view of a system for performing an operation on a component of an engine, as well as a schematic view of the component, in accordance with an exemplary embodiment of the present disclosure.

Referring now to FIG. 3, a close-up, schematic view is provided of a turbine engine assembly 200 having a turbine engine 202 and a system 204 for performing an operation on a component 206 of the turbine engine 202. In certain exemplary embodiments, the turbine engine 202 may be a turbomachine of a gas turbine engine, such as the exemplary turbomachine 16 of the turbofan engine 10 described above with reference to FIG. 1. Additionally, the component 206 of the turbine engine 202 may be, e.g., one or more of an airfoil, a liner, or a shroud of the turbine engine 202. As will be appreciated from FIG. 3, for the embodiment depicted the component 206 is more particularly an airfoil. For example, the component 206 may be one or more of a compressor rotor blade, a compressor stator vane, a turbine rotor blade, a turbine stator vane, an inlet guide vane, an outlet guide vane, an inner or outer turbine shroud, an inner or outer compressor shroud, a compressor section liner, a turbine section liner, an inner combustion chamber liner, an outer combustion chamber liner, etc. Accordingly, in at least certain exemplary embodiments, the component 206 may be positioned within an interior 208 of the turbine engine 202 (i.e., within an outer casing 210 of the turbine engine 202, similar to the exemplary outer casing 18 of the turbomachine 16 described above with reference to FIG. 1). More specifically, for the exemplary aspect depicted, the component 206 is exposed to a core air flowpath 212 of the turbine engine 202 (similar to the exemplary core air flowpath 37 of the exemplary turbomachine 16 described above with reference to FIG. 1). In such a manner, it will be appreciated that the component 206 generally includes a first side 214 positioned within the interior 208 of the turbine engine 202, and more specifically, exposed to the core air flowpath 212 of the turbine engine 202, and an opposite, second side 216 (not shown in FIG. 3). For the embodiment depicted, the second side 216 is also positioned within the interior 208 of the turbine engine 202, and more specifically, exposed to the core air flowpath 212 of the turbine engine 202.

It will further be appreciated that for at least certain turbine engines 202, such as the one depicted, the component 206 may be positioned proximate one or more openings of the turbine engine 202. For example, the exemplary turbine engine 202 within which the component 206 of FIG. 3 is positioned includes a first opening 218A and a second opening 218B. The first opening 218A and the second opening 218B extend through, e.g., the casing 210 of the turbine engine 202 and an outer shroud 219 surrounding the component 206. The first opening 218A and/or the second opening 218B may be, e.g., borescope openings (see, e.g., exemplary borescope openings 70 of FIG. 1). Additionally, in other embodiments, the turbine engine 10 may have any other suitable position and/or configuration of openings.

As will also be appreciated, the exemplary system 204 depicted in FIG. 3 includes a first robotic arm 220 and a second robotic arm 222, and more specifically, a first robotic arm assembly 224 including the first robotic arm 220 and a second robotic arm assembly 226 including the second robotic arm 222. In at least certain exemplary embodiments, the first robotic arm assembly 224 and second robotic arm assembly 226 may each be configured in a similar manner as the exemplary robotic arm assembly 100 described above with reference to FIG. 2. Accordingly, it will be appreciated that the first robotic arm 220 of the first robotic arm assembly 224 extends between a first root end 228 and a first distal end 230, and the first robotic arm 220 generally includes a first utility member 232 positioned at the first distal end 230. The first robotic arm 220 is movable to the interior 208 of the engine to a location operably adjacent to the first side 214 of the component 206. In such a manner, it will be appreciated that the first robotic arm 220 is positioned through at least one of a plurality of openings of the turbine engine 202, and more specifically, through the first opening 218A of the turbine engine 202, such that the first utility member 232 of the first robotic arm 220 is positioned operably adjacent to the first side 214 of the component 206 during operation. It will be appreciated, that as used herein, the term "operably adjacent to" with reference to a utility member and a surface of the component, refers to the utility member being positioned such that it may perform the operation for which it was designed on the component.

Similarly, the second robotic arm 222 of the second robotic arm assembly 226 extends between a second root end 234 and a second distal end 236, and the second robotic arm 222 generally includes a second utility member 238 positioned at the second distal end 236. The second robotic arm 222 is also movable to the interior 208 of the turbine engine 202 to facilitate the first utility member 232 and the second utility member 238 performing the operation on the component 206 of the turbine engine 202. In such a manner, it will be appreciated that the second robotic arm 222 is also positioned through at least one of a plurality of openings of the turbine engine 202, and more specifically, through the second opening 218B of the turbine engine 202, to facilitate the first and second utility members 232, 238 performing the operation on the component 206 of the turbine engine 202.

As noted, one or both of the first robotic arm assembly 224 and second robotic arm assembly 226 may be configured in a manner similar to the exemplary robotic arm assembly 100 described above with reference to, e.g., FIG. 2. Accordingly, it will be appreciated that the first robotic arm assembly 224 further includes a first base 240 with the first robotic arm 220 operably connected to the first base 240. The first base 240 includes one or more motors 242, or actuators (such as an actuator pack), for controlling the first robotic arm 220, and the first base 240 is configured for positioning outside of the interior 208 of the turbine engine 202. Similarly, it will be appreciated that the second robotic arm assembly 226 further includes a second base 244 with the second robotic arm 222 operably connected to the second base 244. The second base 244 also includes one or more motors 246, or actuators (such as an actuator pack), for controlling the second robotic arm 222 and the second base 244 is configured for positioning outside of the interior 208 of the turbine engine 202. Accordingly, the first and second bases 240, 244 are each positioned outside of the interior 208 of the turbine engine 202 during operation of the system 204 (e.g., during the performance of the operation on the component 206 of the turbine engine 202 by the system 204).

It will be appreciated, however, that in other exemplary embodiments, the first robotic arm assembly 224, the second robotic arm assembly 226, or both may have any other suitable configuration. For example, although the first base 240 of the first robotic arm assembly 224 is depicted as being positioned physically separate from the second base 244 of the second robotic arm assembly 226, in other exemplary embodiments, the first base 240 and second base 244 may be integrated as a single, contained unit. Additionally, one or both of the first robotic arm 220 and second robotic arm 222 may be constructed in any suitable manner, and one or both of the first base 240 and second base 244 may have any other suitable structure for controlling such robotic arms (e.g., any suitable motor/actuator configuration, etc.).

As is also depicted schematically in FIG. 3, the system 204 includes a controller 246. The exemplary controller 246 is operably connected to the first base 240 of the first robotic arm assembly 224 and the second base 244 of the second robotic arm assembly 226 for controlling the first robotic arm 220 and the second robotic arm 222. Notably, although the controller 246 is depicted as being positioned physically separate from the first robotic arm assembly 224 and second robotic arm assembly 226, in other embodiments, the controller 246 may be positioned, or otherwise integrated into, the first base 240 of the first robotic arm assembly 224, the second base 244 of the second robotic arm assembly 226, or both. Additionally, or alternatively, the controller 246 may be integrated into, and/or operable with, any other suitable system.

The controller 246 generally includes a network interface 248. The network interface 248 may be operable with any suitable wired or wireless communications network for communicating data with other components of, e.g., the robotic arm assembly 100, and/or other components or systems not depicted. As depicted using phantom lines in FIG. 3, for the embodiment depicted, the network interface 248 utilizes a wireless communication network 250 to communicate data with other components. Specifically, for the embodiment shown, through the network interface 248 of the controller 246 and the wireless communication network 250, the controller 246 is operably coupled to the first base 240 of the first robotic arm assembly 224 and the second base 244 of the second robotic arm assembly 226. For example, the controller 246 may be operably coupled to the one or more motors 242 of the first base 240 and/or the one or more motors 246 of the second base 244. In such a manner, the controller 246 may control operation of the first robotic arm 220 and the second robotic arm 222. It will be appreciated, of course, that although the network interface 248 utilizes the wireless communication network 250 for the embodiment of FIG. 3, in other embodiments, the network interface 248 may instead utilize a wired communication network, or a combination of wired and wireless communication networks.

Referring still to FIG. 3, the controller 246 further includes one or more processors 252 and memory 254. The memory 254 stores data 256 accessible by the one or more processors 252. The one or more processor(s) 252 can include any suitable processing device, such as a microprocessor, microcontroller, integrated circuit, logic device, and/or other suitable processing device. The one or more memory device(s) 254 can include one or more computer-readable media, including, but not limited to, non-transitory computer-readable media, RAM, ROM, hard drives, flash drives, and/or other memory devices. The data 256 may include instructions that when executed by the one or more processors 252 cause the system 204 to perform functions. One or more exemplary aspects of these functions may be described below with respect to the exemplary method 300 of FIG. 9. The instructions within the data 256 can be any set of instructions that when executed by the one or more processor(s) 252, cause the one or more processor(s) 252 to perform operations. In certain exemplary embodiments, the instructions within the data 256 can be software written in any suitable programming language or can be implemented in hardware. Additionally, and/or alternatively, the instructions can be executed in logically and/or virtually separate threads on processor(s) 252. The memory device(s) 254 can further store other data 256 that can be accessed by the processor(s) 252.

Figure 4:
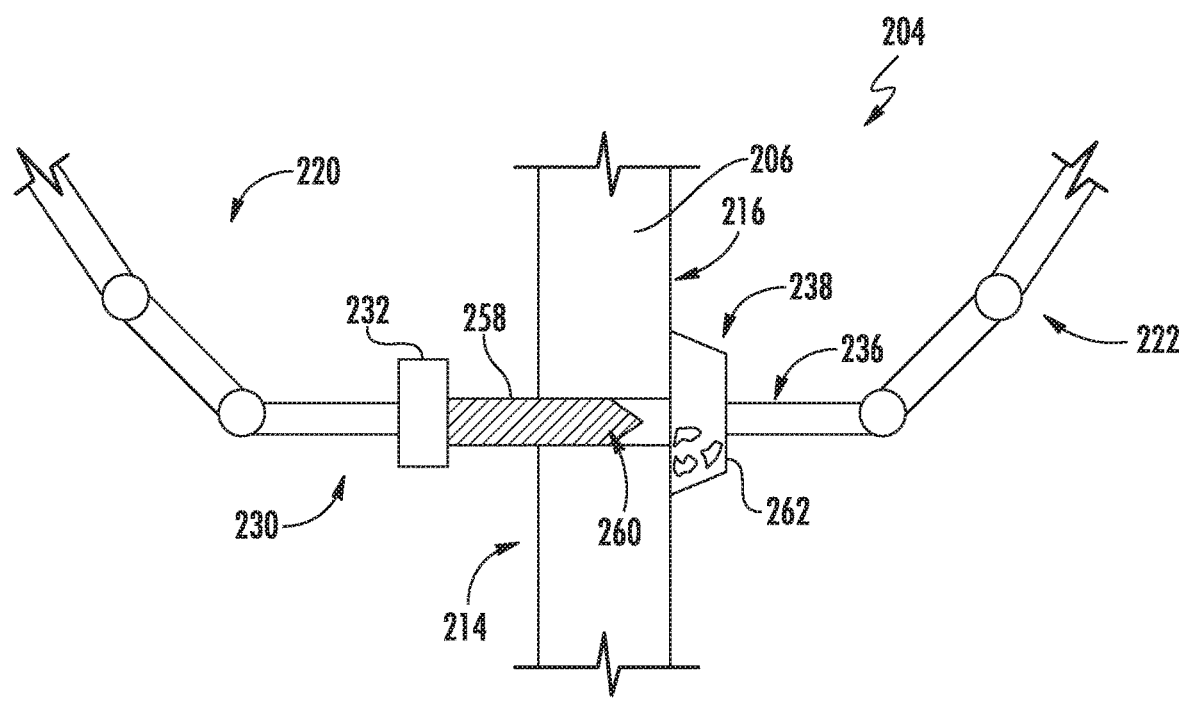
FIG. 4 is a close-up view of a system for performing an operation on a component in accordance with another exemplary embodiment of the present disclosure.

Referring now to FIG. 4, a close-up, schematic view of the exemplary system 204 of FIG. 3 is depicted. It will be appreciated that for the exemplary embodiment depicted, the operation being performed by the system 204 on the component 206 is a physical operation on the component (i.e., physically modifying the component). More particularly, for the embodiment depicted, the operation is a material removal operation, and more specifically still is a drilling operation. Notably, as used herein, the term "drilling operation" refers generally to any operation used to make a hole in or through a component, whether the hole is circular in cross-section or defines some other shape. However, in other embodiments, the operation may be any other suitable physical operation (such as a material modification operation, or a material addition operation (such as a welding operation; see, e.g., FIG. 7)), or other operation, as described more fully below.

As is depicted in FIG. 4, for the exemplary embodiment depicted, the first utility member 232 of the first robotic arm 220 includes a mechanical drill having a drill bit 258. The first utility member 232 may be configured to rotate the drill (and drill bit 258) to drill a hole 260 in or through the component 206, i.e., from the first side 214 of the component 206 towards or to the second side 216 of the component 206. The hole 260 may be, e.g. a cooling hole, or may be provided for any other purpose. Additionally, it will be appreciated that the hole 260 may be a new hole drilled by the mechanical drill of the first utility member 232, or alternatively, may be an existing hole that is, e.g. clogged, needs to be widened, etc.

Also for the embodiment depicted, the second utility member 238 includes at least one of a container or a suction member. More specifically, for the embodiment of FIG. 4, the second utility member 238 includes a container 262 for positioning over the hole 260 on the second side 216 of the component 206 to capture or otherwise contain debris and/or other materials resulting from the operation of the mechanical drill of the first utility member 232 to drill the hole 260 in the component 206. More particularly, for the embodiment of FIG. 4, the container 262 is positioned completely around/over the hole 260 on the second side 216 of the component 206, contacting the second side 216 of the component 206. However, in other embodiments, the container 262 may instead be positioned elsewhere to capture debris from the drilling operation. For example, in other embodiments, the container 262 may be positioned underneath the mechanical drill of the first utility member 232 on the first side 214 of the component 206 to catch debris falling from the mechanical drill. Similarly, the container 262 may be positioned underneath the opening on the second side 216 of the component 206 of the hole 260 being drilled by the mechanical drill to catch the debris when the mechanical drill breaks through the second side 216 of the component 206, or otherwise completes drilling operations of the hole 260.

However, in other exemplary embodiments any other suitable component 206 or feature may be provided for catching the debris resulting from the drilling operation. For example, referring briefly to FIG. 5, a close-up, schematic view is provided of a system 204 in accordance with another exemplary embodiment of the present disclosure. The exemplary system 204 of FIG. 5 may be configured in substantially the same manner as the exemplary system 204 described above with reference to FIG. 4. However, for the embodiment of FIG. 5, instead of including a container 262, a second utility member 238 of a second robotic arm 222 instead includes a suction member 264. The suction member 264 generally defines a suction nozzle for capturing debris or other particles resulting from the drilling operation. In at least certain exemplary embodiments, the second robotic arm 222 may include one or more vacuum lines (not shown; e.g., supported by support structures 122, see FIG. 2) extending therethrough in airflow communication with the suction member 264 for providing a desired suction to the suction member.

Further, in still other exemplary embodiments, any other suitable component 206 or feature may be provided for facilitating the drilling operation. For example, referring briefly to FIG. 6, a close-up, schematic view is provided of a system 204 in accordance with yet another exemplary embodiment of the present disclosure. The exemplary system 204 of FIG. 6 may be configured in substantially the same manner as exemplary system 204 described above with reference to FIG. 4. However, for the embodiment of FIG. 6, instead of including a first robotic arm 220 having a first utility member 232 at a first distal end 230 thereof, with the first utility member 232 being a mechanical drill, the first utility member 232 includes a laser drill 266. The laser drill 266 of the first utility member 232 is similarly configured to be positioned operably adjacent to the first side 214 of the component 206, and oriented towards the first side 214 of the component 206 during drilling operations. In such a manner, the laser drill 266 of the first utility member 232 defines a line of sight of access to the first side 214 of the component 206, and is separated by a distance of no more than a distance at which the laser drill 266 may effectively operate (i.e., drill into, or through, the component 206), such that it may drill a hole 260 in the component 206 at a desired position and orientation into/through the component 206. It will be appreciated that the laser drill 266 is generally configured to direct a laser beam 268 towards the component 206 to drill the hole 260 therethrough. In such a manner, the laser drill 266 may be configured as any suitable laser drill. For example, in certain embodiments, the laser drill may be a Nd:YAG laser drill or any other suitable laser drill.

Figure 5:
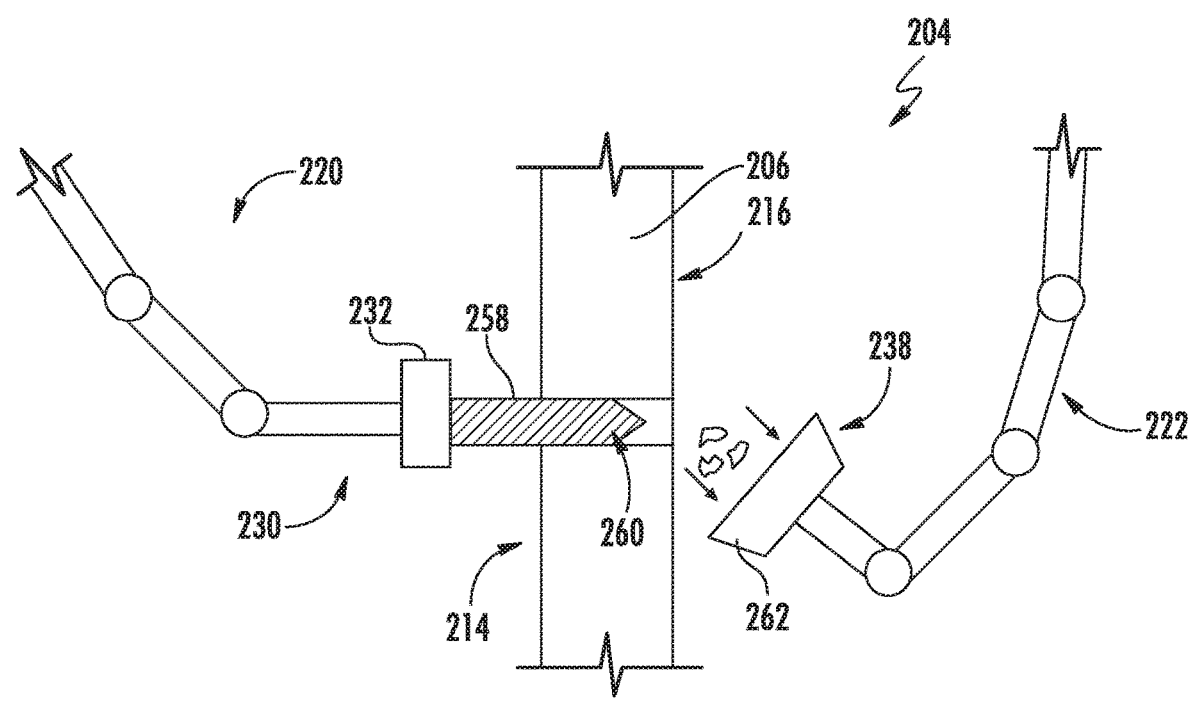
FIG. 5 is a close-up view of a system for performing an operation on a component in accordance with yet another exemplary embodiment of the present disclosure.
Figure 6:
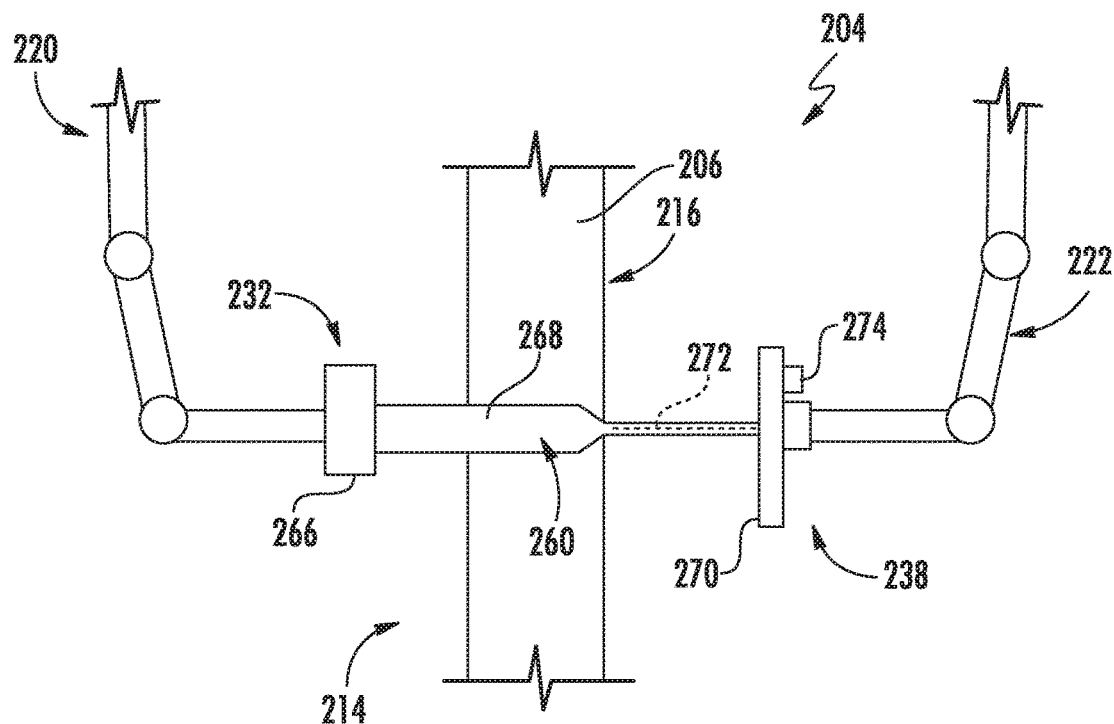
FIG. 6 is a close-up view of a system for performing an operation on a component in accordance with still another exemplary embodiment of the present disclosure.

Further, for the exemplary embodiment of FIG. 6, a second utility member 238 of a second robotic arm 222 positioned at a second distal end 236 thereof may not be configured as at least one of a container (FIG. 4) or a suction member (FIG. 5). Instead, for the exemplary embodiment of FIG. 6, the second utility member 238 of the second robotic arm 222 includes a laser beam receiver 270. Notably, the laser beam receiver 270 of the second utility member 238 is aligned with an axis 272 of the laser beam 268 from the laser drill 266 of the first utility member 232 during drilling operations of the system 204. The laser beam receiver 270 may be any suitable material or component capable of absorbing or dissipating a laser beam 268 from the laser drill 266 after such laser beam 268 has broken through the second side 216 of the component 206, preventing an amount of potential damage to various other components within the interior 208 of the turbine engine 202. The laser beam receiver 270 may also be referred to as a back strike protection member or a "beam dump." For example, in at least certain exemplary embodiments, the laser beam receiver 270 may be a plate comprising a metal or other sufficiently robust material capable of withstanding drilling from the laser beam 268 of the laser drill 266 for at least a minimal amount of time. It will be appreciated, however, that in other embodiments, the laser beam receiver 270 may have any other suitable configuration for performing the functions described herein. Additionally, in at least certain exemplary embodiments, the laser beam receiver 270 may further include suction features (similar to the suction member 264 discussed above) for removing cutting debris (e.g., vapor, hot liquid droplets, etc.) from the environment to prevent damage to adjacent surfaces, and/or air blowing features, such as an air curtain or other wide jet of pressurized air to deflect debris to a relatively less sensitive location.

Notably, in at least certain embodiments, the laser beam receiver 270 may include one or more sensors coupled thereto, operable therewith, and/or embedded therein. Specifically, for the embodiment depicted, the laser beam receiver 270 includes a sensor 274 coupled thereto. The sensor 274 may be configured to sense when the laser beam 268 of the laser drill 266 contacts the laser beam receiver 270. In such a manner, the sensor 274 may be capable of sensing data indicative of a breakthrough of the laser beam 268 through the component 206. In at least certain exemplary embodiments, the sensor 274 may be operably coupled to the controller 246 through, e.g., the wireless communication network 250 (see FIG. 3). The sensor 274 may be any suitable sensor for sensing data indicative of the laser beam 268 contacting the laser beam receiver 270. For example, the sensor 274 may be one or more of, e.g., a temperature sensor, an accelerometer, an optical sensor, and acoustic sensor, etc.

Figure 7:
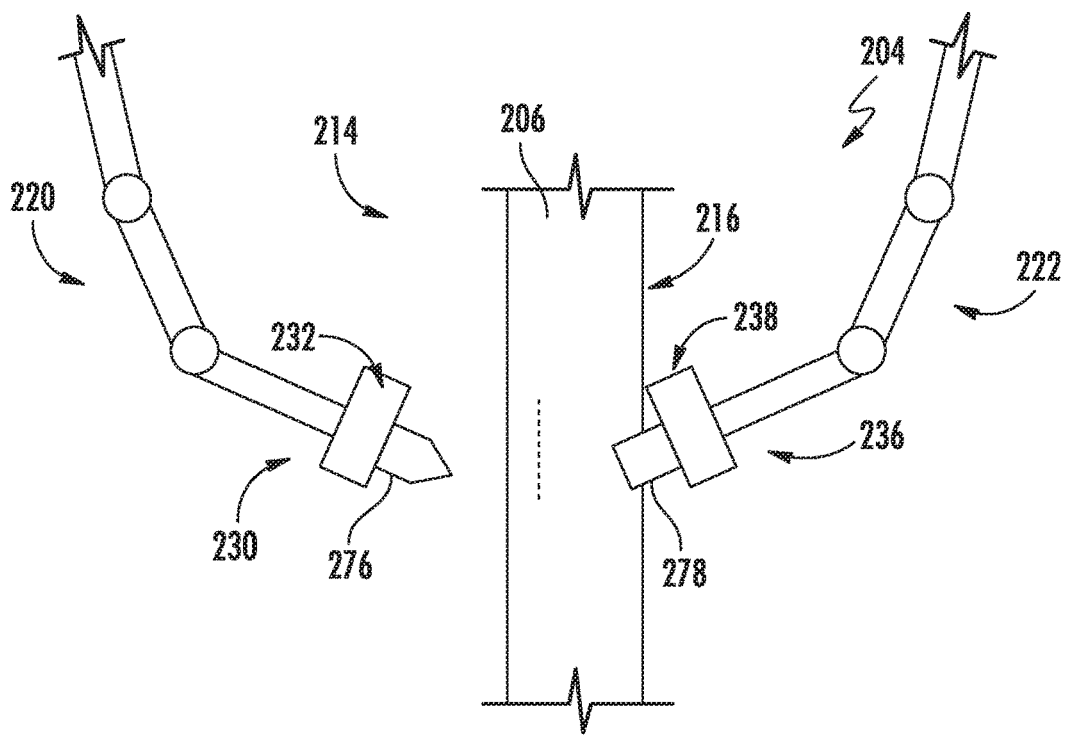
FIG. 7 is a close-up view of a system for performing an operation on a component in accordance with yet another exemplary embodiment of the present disclosure.
Figure 8:
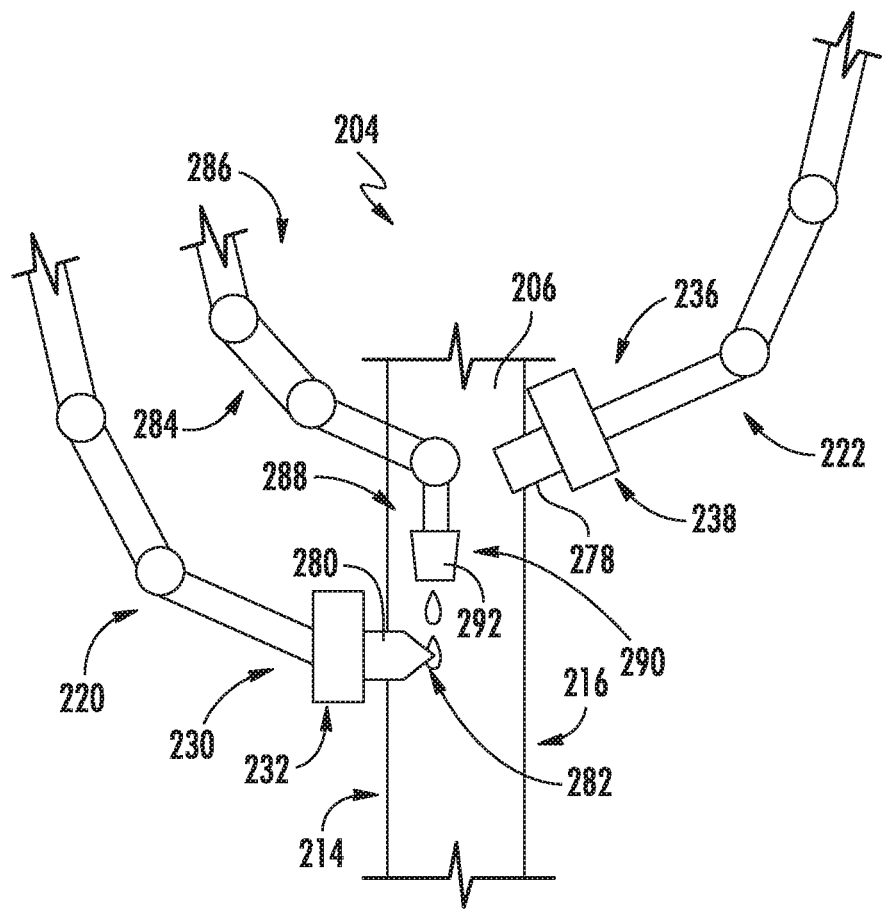
FIG. 8 is a close-up view of a system for performing an operation on a component in accordance with still another exemplary embodiment of the present disclosure.

Referring now to FIGS. 7 and 8, close-up, schematic views are provided of two additional systems 204, each configured in accordance with other exemplary embodiments of the present disclosure. The exemplary systems 204 of FIGS. 7 and 8 may each be configured in substantially the same manner as exemplary system 204 described above with reference to FIG. 4. For example, each of the exemplary systems 204 of FIGS. 7 and 8 includes a first robotic arm 220 including a first utility member 232 positioned at a first distal end 230 of the first robotic arm 220 and a second robotic arm 222 including a second utility member 238 positioned at a second distal end 236 of the second robotic arm 222.

Referring first particularly to the exemplary system 204 of FIG. 7, it will be appreciated that the operation performed by the system 204 is a welding operation. With such an exemplary embodiment, the first utility member 232 includes an electrode 276 and the second utility member 238 includes an electrical connector 278 configured for electrical connection to the component 206. More specifically, for the embodiment of FIG. 7, the second utility member 238, or rather, the electrical connector 278 of the second utility member 238, is configured to contact the component 206. In such a manner, the system 204 may provide for an electrical path through the component 206 during welding operations that avoids any sensitive components, such as bearings, that may otherwise be damaged by electrical paths extending therethrough. Accordingly, it will be appreciated that although for the embodiment depicted, the electrical connector 278 of the second utility member 238 is directly contacting the actual component 206, in other embodiments, the electrical connector 278 may instead contact any other suitable components of the turbine engine 202 capable of providing an electrical connection with the component 206 without any substantial risk of the electrical path extending through undesirable, sensitive components.

Further, it will be appreciated that depending on the desired welding technology to be utilized, one or both of the first robotic arm 220 and second robotic arm 222 may include additional components, features, etc. For example, in certain exemplary embodiments, the system 204 may be configured for gas metal arc welding, tungsten inert gas welding, arc welding, etc. With one or more of these embodiments, one or both of the first robotic arm 220 and second robotic arm 222 may include a gas line, or alternatively, an additional robotic arm (not shown) may be included with a gas line, to provide a working gas for the welding.

Referring now particularly to the exemplary system 204 of FIG. 8, it will be appreciated that the operation performed by the system 204 is, again, a drilling operation. However, for the embodiment of FIG. 8, the first utility member 232 includes an electric discharge machine tool 280 positioned operably adjacent to the first side 214 of the component 206, and oriented towards the first side 214 of the component 206 during drilling operations. In such a manner, the electric discharge machine tool 280 of the first utility member 232 is positioned in a relatively close proximity to the first side 214 of the component 206 such that it may drill a hole in the component 206 at a desired position and orientation through the component 206. For example, the electric discharge machine tool 280 may be a tool electrode configured to discharge a current to the first side 214 of the component 206 (or along a hole through the component 206), across a discharge gap 282 defined with the first side 214 of the component 206. Similarly, with such an exemplary embodiment, the second utility member 238 includes an electrical connector 278 configured for electrical connection to the component 206. More specifically, for the embodiment of FIG. 8, the electrical connector 278 of the second utility member 238 is configured to contact the component 206 to create a charge differential between, e.g., the tool electrode 276 of the electric machine tool of the first utility member 232 and the component 206.

Notably, in order to further facilitate operation of the electric discharge machine drilling of a hole in the component 206, the exemplary system 204 of FIG. 8 further includes a third robotic arm 284 of a third robotic arm assembly 286. The third robotic arm assembly 286, and third robotic arm 284, may also be configured in substantially the same manner as the exemplary robotic arm assembly 100 described above with reference to FIG. 2. Accordingly, the third robotic arm 284 extends generally between a root end (not shown) and a distal end 288 and includes a third utility member 290 positioned at the third distal end 288. For the embodiment of FIG. 8, the third utility member 290 includes a dielectric fluid nozzle 292 for providing a dielectric fluid to a location between the first utility member 232 (i.e., the electric discharge machine tool 280 for the embodiment depicted) and the component 206. Providing the dielectric fluid may facilitate the electric discharge machine tooling by the system 204.

It will be appreciated that in other exemplary embodiments, still other configurations may be provided. For example, although the exemplary system 204 depicted in FIG. 8 is the only system 204 described herein as including three robotic arms for facilitating the operations, in other exemplary embodiments, one or more of the embodiments described above with reference to, e.g., FIGS. 3 through 7 may additionally include a third robotic arm, and optionally may include any other suitable number of robotic arms. Similarly, although for the embodiment of FIG. 8, the electric discharge machine operations are depicted using three separate robotic arms, in other exemplary embodiments, the features and functionality of one of the exemplary robotic arms depicted may instead be integrated into one of the other robotic arms, such that only two robotic arms are utilized to provide electric discharge machine tooling.

Further, still other embodiments, any other suitable physical operations may be performed using a system 204 in accordance with one or more the exemplary embodiments described herein. For example, the operation may additionally, or alternatively, include one or more cutting operations, brazing operations, coating or slurry repair operations, etc. Specifically, for example, the operations may be a coating repair process (such as a thermal barrier coating repair process), whereby a first robotic arm is operable to remove at least a portion of an existing coating and a second robotic arm is operable to apply a new coating. Similarly, the operation may be a slurry repair operation for a ceramic matrix composite (CMC) component, such as a CMC liner, CMC shroud, etc. With such an operation, a first robotic arm may be operable to apply a slurry and a second robotic arm is operable to cure the slurry. Additionally, one or both of the first and second robotic arms (or additional robotic arms) may be operable to contour and/or level the slurry. In such a manner, it will be appreciated, that as used herein, the term "facilitate" may refer to performing a function simultaneously (e.g., first and second robotic arms working together simultaneously to perform the operation), or alternatively may refer to performing functions sequentially. However, in still other exemplary embodiments, any other suitable non-physical operations may be performed by the system. For example, the operations may be cleaning operations (such as sandblasting, pressure washing, steam washing), etc.

Moreover, it should be appreciated that although the exemplary system 204 described herein is depicted performing operations on a turbine engine 202, in other exemplary embodiments, the system 204 may instead be utilized to perform operations on any other suitable engine, such as a rotary engine. Further, the system 204 described herein may additionally, or alternatively, may be utilized outside of the context of an engine in, e.g., relatively dangerous environments to perform operations. For example, in certain embodiments, the system 204 may be utilized within the oil and gas industry to, e.g., weld, cut, drill, etc. in, e.g., explosive atmospheres. Further, still, in certain embodiments, the system 204 may be utilized in the nuclear industry to, e.g., drill, cut, weld, etc. in a reactor or other container.

Figure 9:
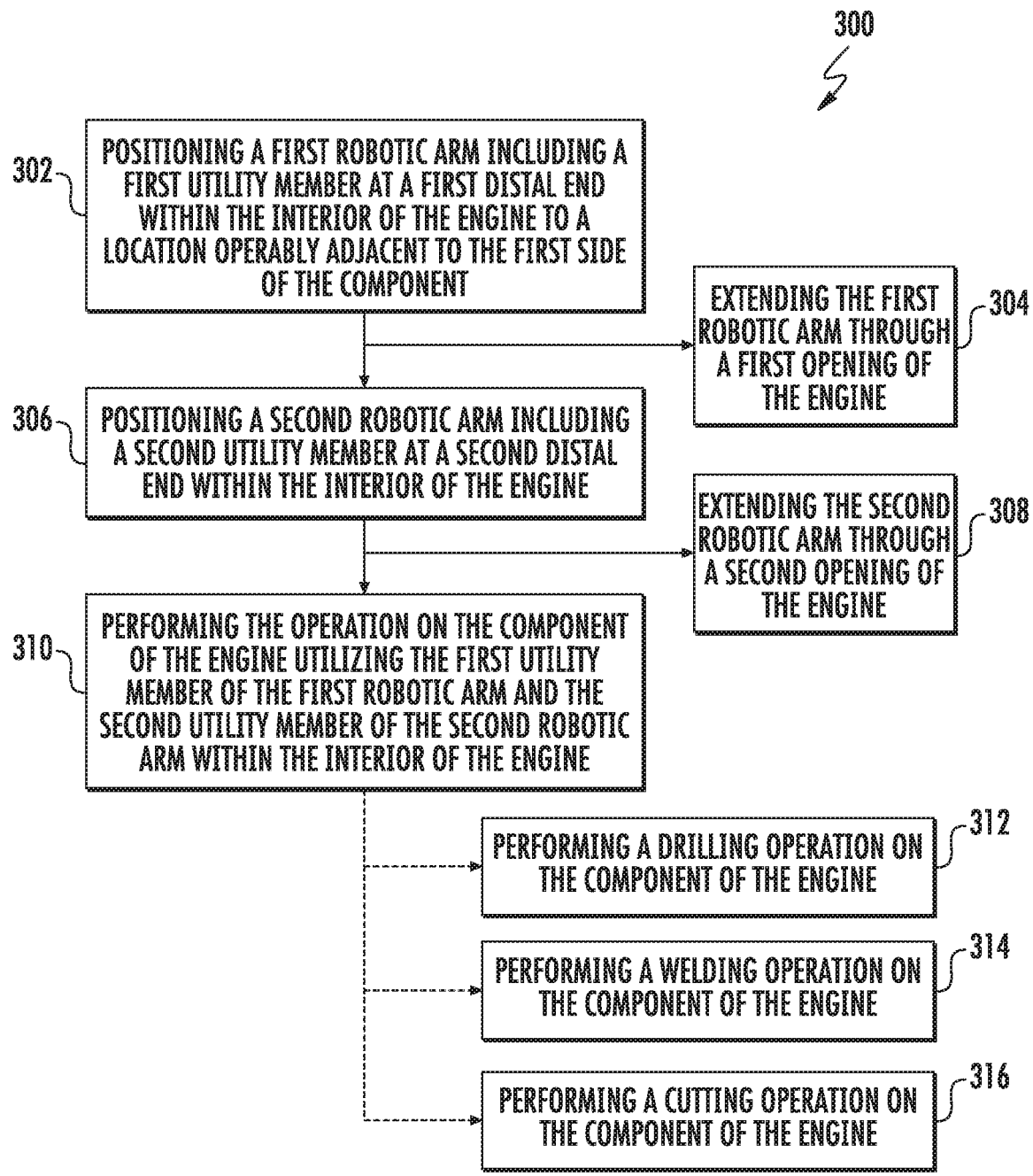
FIG. 9 is a flow diagram of a method for performing an operation on a component of an engine in accordance with an exemplary aspect of the present disclosure.

Referring now to FIG. 9, a flow diagram of a method 300 for performing an operation on a component of an engine in accordance with an exemplary aspect of the present disclosure is provided. The exemplary method 300 may utilize one or more of the exemplary systems described above. Accordingly, it will be appreciated that in at least certain exemplary aspects, the component may include a first side positioned within an interior of the engine.

As is depicted, the exemplary method 300 generally includes at (302) positioning a first robotic arm including a first utility member at a first distal end within the interior of the engine to a location operably adjacent to the first side of the component. Notably, for the exemplary aspect depicted, it will be appreciated that the engine defines a plurality of openings. For example, when the engine is a gas turbine engine, or other turbine engine, the plurality of openings may include one or more of a borescope opening, a fuel nozzle opening, an igniter opening, an inlet opening, an exhaust opening, etc. Further, for the exemplary aspect depicted, positioning the first robotic arm within the interior of the engine at (302) includes at (304) extending the first robotic arm through a first opening of the engine.

The exemplary method 300 further includes at (306) positioning a second robotic arm including a second utility member at a second distal end within the interior of the engine. Similarly, for the exemplary aspect depicted, positioning the second robotic arm within the interior of the engine at (306) includes at (308) extending the second robotic arm through a second opening of the engine.

Further, the exemplary method 300 includes at (310) performing the operation on the component of the engine utilizing the first utility member of the first robotic arm and the second utility member of the second robotic arm within the interior of the engine. The operation performed at (310) may be any suitable operation. For example, as is depicted in phantom, in at least certain exemplary aspects, performing the operation on the component of the engine at (310) may include at (312) performing a drilling operation on the component of the engine. Additionally, or alternatively, in certain exemplary aspects, performing the operation on the component of the engine at (310) may include at (314) performing a welding operation on the component of the engine, or at (316) performing a cutting operation on the component of the engine.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A system for performing an operation on a component of an engine, the component including a first side positioned within an interior of the engine and a second side positioned within the interior of the engine, the system comprising:

a first robotic arm defining a first distal end and including a first utility member positioned at the first distal end; and a second robotic arm defining a second distal end and including a second utility member positioned at the second distal end, wherein the first utility member is moveable to the interior of the engine to a first location operably adjacent to the first side of the component, wherein the second utility member is moveable to the interior of the engine to a second location operably adjacent to the second side of the component, wherein the first and second utility members cooperate with each other to perform the operation on the component of the engine, with the first utility member operating from the first location and the second utility member operating from the second location, wherein the operation is a drilling operation, wherein the first utility member includes a mechanical drill, wherein the second utility member includes at least one of a container or a suction member configured to hold or suction debris from the drilling operation, wherein the first utility member is configured to contact the first side of the component, and wherein the second-side of the component is opposite the first side of the component.

2. The system of claim 1, wherein the second side of the component is opposite the first side of the component.

3. The system of claim 1, wherein the first utility member directly faces the first side of the component, and the second utility member directly faces the second side of the component.

4. The system of claim 1, wherein the first robotic arm is operably connected to a first base, wherein the first base includes one or more motors for controlling the first robotic arm, wherein the first base is configured for positioning outside of the interior of the engine, wherein the second robotic arm is operably connected to a second base, wherein the second base includes one or more motors for controlling the second robotic arm, and wherein the second base is configured for positioning outside of the interior of the engine.

5. A system for performing an operation on a component of an engine, the component including a first side positioned within an interior of the engine and a second side positioned within the interior of the engine, the system comprising:

a first robotic arm defining a first distal end and including a first utility member positioned at the first distal end; and a second robotic arm defining a second distal end and including a second utility member positioned at the second distal end, wherein the first utility member is moveable to the interior of the engine to a first location operably adjacent to the first side of the component, wherein the second utility member is moveable to the interior of the engine to a second location operably adjacent to the second side of the component, wherein the first and second utility members cooperate with each other to perform the operation on the component of the engine, with the first utility member operating from the first location and the second utility member operating from the second location, wherein the operation is a drilling operation,
wherein the first utility member includes a laser drill configured for orientation towards the first side of the component, and
wherein the second utility member includes a laser beam receiver.

6. The system of claim 5,
wherein the first robotic arm is operably connected to a first base,
wherein the first base includes one or more motors for controlling the first robotic arm,
wherein the first base is configured for positioning outside of the interior of the engine,
wherein the second robotic arm is operably connected to a second base,
wherein the second base includes one or more motors for controlling the second robotic arm, and
wherein the second base is configured for positioning outside of the interior of the engine.

7. A system for performing an operation on a component of an engine, the component including a first side positioned within an interior of the engine and a second side positioned within the interior of the engine, the system comprising:
a first robotic arm defining a first distal end and including a first utility member positioned at the first distal end; and
a second robotic arm defining a second distal end and including a second utility member positioned at the second distal end,
wherein the first utility member is moveable to the interior of the engine to a first location operably adjacent to the first side of the component,
wherein the second utility member is moveable to the interior of the engine to a second location operably adjacent to the second side of the component,
wherein the first and second utility members cooperate with each other to perform the operation on the component of the engine, with the first utility member operating from the first location and the second utility member operating from the second location,
wherein the first utility member includes an electric discharge machine tool configured for orientation towards the first side of the component, and
wherein the second utility member includes an electrical connector configured for electrical connection to the component.

8. The system of claim 7, further comprising:
a third robotic arm defining a third distal end and including a third utility member positioned at the third distal end, the third utility member including a dielectric fluid nozzle for providing a dielectric fluid to a location between the first utility member and the component.

9. The system of claim 7,
wherein the first robotic arm is operably connected to a first base,
wherein the first base includes one or more motors for controlling the first robotic arm,
wherein the first base is configured for positioning outside of the interior of the engine,
wherein the second robotic arm is operably connected to a second base,
wherein the second base includes one or more motors for controlling the second robotic arm, and
wherein the second base is configured for positioning outside of the interior of the engine.

10. A system for performing an operation on a component of an engine, the component including a first side positioned within an interior of the engine and a second side positioned within the interior of the engine, the system comprising:
a first robotic arm defining a first distal end and including a first utility member positioned at the first distal end; and
a second robotic arm defining a second distal end and including a second utility member positioned at the second distal end,
wherein the first utility member is moveable to the interior of the engine to a first location operably adjacent to the first side of the component,
wherein the second utility member is moveable to the interior of the engine to a second location operably adjacent to the second side of the component,
wherein the first and second utility members cooperate with each other to perform the operation on the component of the engine, with the first utility member operating from the first location and the second utility member operating from the second location,
wherein the operation is a welding operation, wherein the first utility member includes an electrode, and
wherein the second utility member includes an electrical connector configured for electrical connection to the component.

11. The system of claim 10, wherein the second utility member is configured to contact the component.

12. The system of claim 10,
wherein the first robotic arm is operably connected to a first base,
wherein the first base includes one or more motors for controlling the first robotic arm,
wherein the first base is configured for positioning outside of the interior of the engine,
wherein the second robotic arm is operably connected to a second base,
wherein the second base includes one or more motors for controlling the second robotic arm, and
wherein the second base is configured for positioning outside of the interior of the engine.

13. A system for performing an operation on a component of an engine, the component including a first side positioned within an interior of the engine and a second side positioned within the interior of the engine, the system comprising:
a first robotic arm defining a first distal end and including a first utility member positioned at the first distal end; and
a second robotic arm defining a second distal end and including a second utility member positioned at the second distal end,
wherein the first utility member is moveable to the interior of the engine to a first location operably adjacent to the first side of the component,
wherein the second utility member is moveable to the interior of the engine to a second location operably adjacent to the second side of the component,
wherein the first and second utility members cooperate with each other to perform the operation on the component of the engine, with the first utility member operating from the first location and the second utility member operating from the second location,
wherein the engine is a gas turbine engine, and
wherein the component is at least one of an airfoil, a liner, or a shroud.

14. The system of claim 13,
wherein the first robotic arm is operably connected to a first base, wherein the first base includes one or more motors for controlling the first robotic arm, wherein the first base is configured for positioning outside of the interior of the engine, wherein the second robotic arm is operably connected to a second base, wherein the second base includes one or more motors for controlling the second robotic arm, and wherein the second base is configured for positioning outside of the interior of the engine.

15. The system of claim 14, further comprising:
a controller operably connected to the first base and the second base for controlling the first robotic arm and the second robotic arm.

16. The turbine engine assembly of claim 13, wherein the second side of the component is opposite the first side of the component.

17. A turbine engine assembly comprising:
a turbine engine defining an interior and a plurality of openings to the interior, the turbine engine comprising a component having a first side positioned within the interior of the turbine engine and a second side positioned within the interior of the engine; and
a system for performing an operation on the component, comprising:
  a first robotic arm defining a first distal end and including a first utility member positioned at the first distal end; and
  a second robotic arm defining a second distal end and including a second utility member positioned at the second distal end,
wherein the first robotic arm is positioned through one of the plurality of openings of the turbine engine such that the first utility member is positioned at a first location operably adjacent to the first side of the component,
wherein the second robotic arm is positioned through another of the plurality of openings of the turbine engine such that the second utility member is positioned at a second location operably adjacent to the second side of the component,
wherein the first and second utility members cooperate with each other to perform the operation on the component of the turbine engine, with the first utility member operating from the first location and the second utility member operating from the second location.

18. The turbine engine assembly of claim 17,
wherein the operation is a drilling operation,
wherein the first utility member includes a drill, and
wherein the second side of the component is opposite the first side of the component.

19. The turbine engine assembly of claim 17,
wherein the operation is a drilling operation,
wherein the first utility member includes an electric discharge machine tool orientated towards the first side of the component,
wherein the second utility member includes an electrical connector electrically connected to the component, and
wherein the system further includes a third robotic arm defining a third distal end and including a third utility member positioned at the third distal end, the third utility member including a dielectric fluid nozzle providing a dielectric fluid to a location between the first utility member and the component during the operation.

20. The turbine engine assembly of claim 17,
wherein the operation is a welding operation,
wherein the first utility member includes an electrode, and
wherein the second utility member includes an electrical connector electrically connected to the component during the operation.

21. The turbine engine assembly of claim 17, wherein the component is at least one of an airfoil, a liner, or a shroud.

22. The turbine engine assembly of claim 17, wherein the second side of the component is opposite the first side of the component.

23. The turbine engine assembly of claim 17, wherein the first utility member directly faces the first side of the component, and the second utility member directly faces the second side of the component.

24. A method for performing an operation on a component of an engine, the component including a first side positioned within an interior of the engine and a second side positioned within the interior of the engine, the method comprising:
positioning a first robotic arm including a first utility member at a first distal end within the interior of the engine such that the first utility member is positioned at a first location operably adjacent to the first side of the component, wherein positioning the first robotic arm within the interior of the engine comprises extending the first robotic arm through a first opening of the engine;
positioning a second robotic arm including a second utility member at a second distal end within the interior of the engine such that the second utility member is positioned at a second location operably adjacent to the second side of the component, wherein positioning the second robotic arm within the interior of the engine comprises extending the second robotic arm through a second opening of the engine; and
performing the operation on the component of the engine utilizing the first utility member of the first robotic arm and the second utility member of the second robotic arm cooperating with each other within the interior of the engine, with the first utility member operating from the first location and the second utility member operating from the second location.

25. The method of claim 24, wherein performing the operation on the component of the engine comprises performing a drilling operation on the component of the engine.

26. The method of claim 24, wherein performing the operation on the component of the engine comprises performing a welding operation on the component of the engine.

27. The method of claim 24, wherein the second side of the component is opposite the first side of the component.

28. The method of claim 24, wherein the first utility member directly faces the first side of the component, and the second utility member directly faces the second side of the component.

* * * * *